Feb. 15, 1949.　　　L. J. DEVLIN ET AL　　　2,461,967
AERODYNAMIC RETARDER

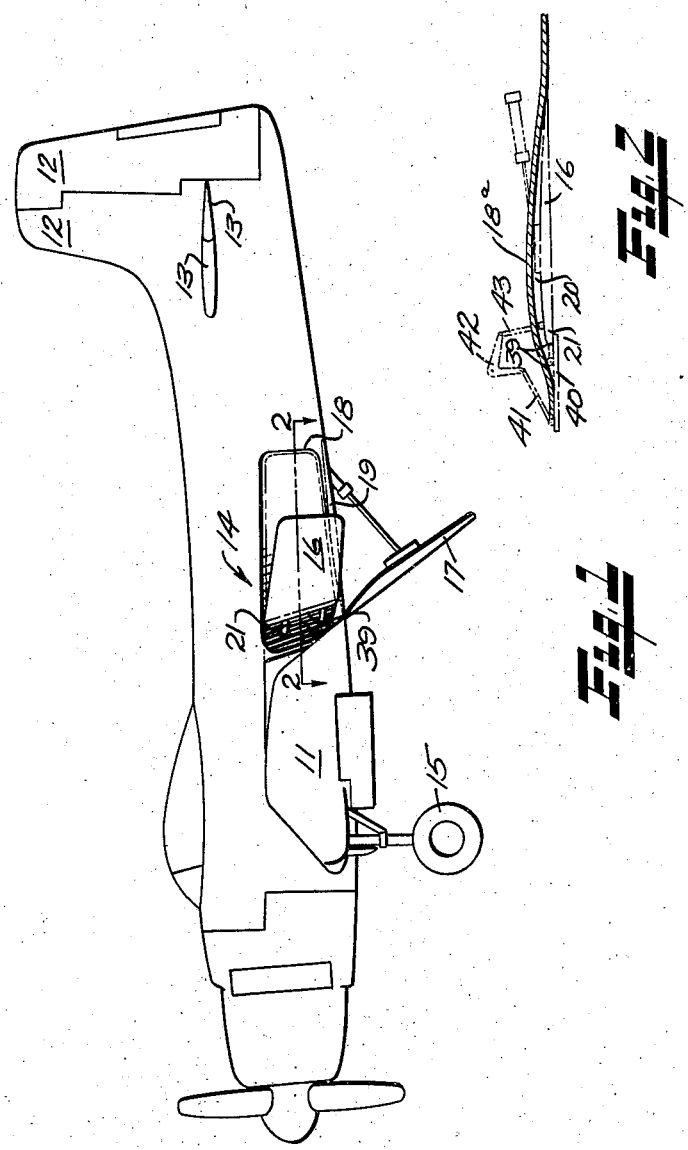

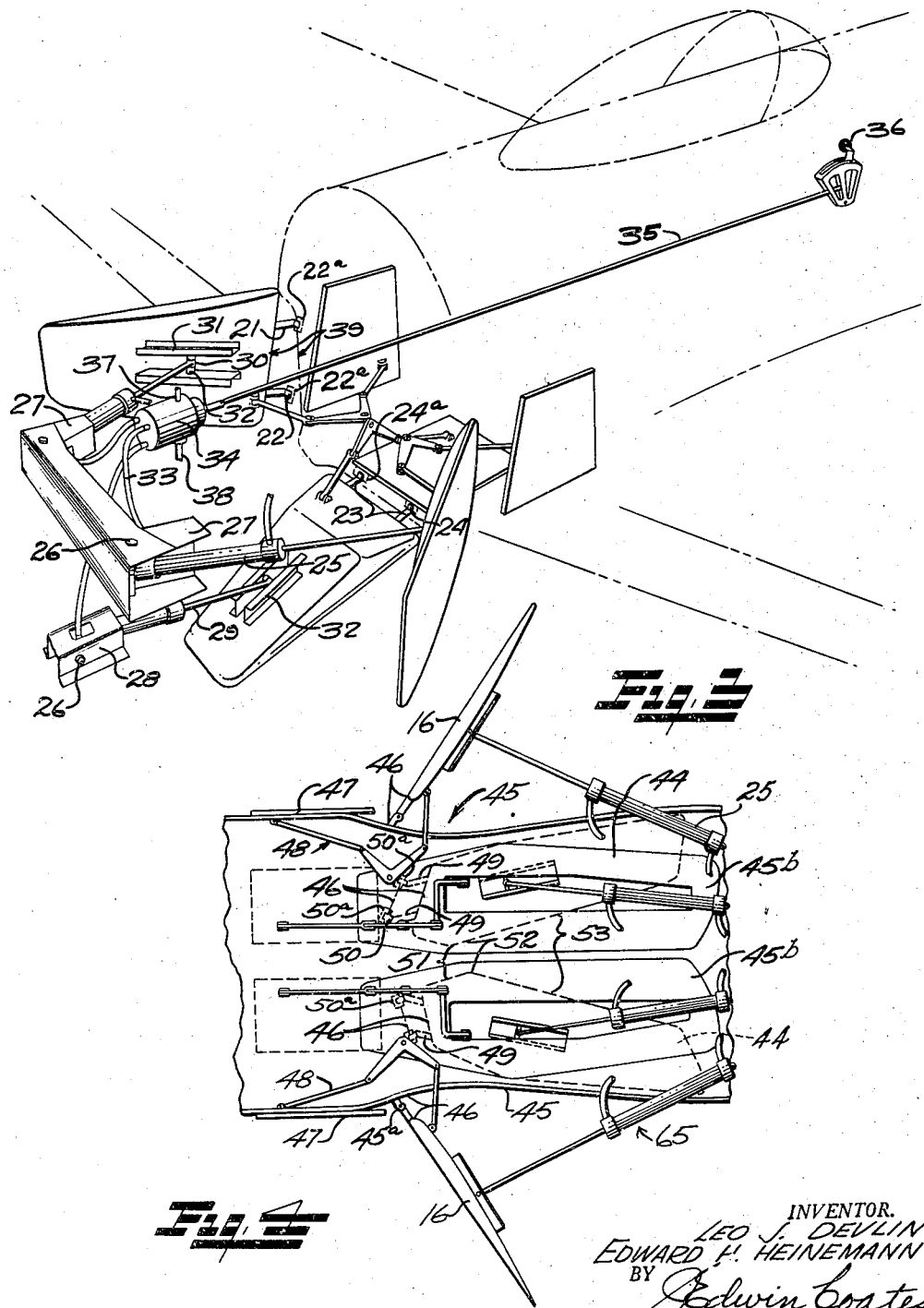

Filed Dec. 26, 1945　　　3 Sheets-Sheet 3

INVENTOR.
LEO J. DEVLIN
EDWARD H. HEINEMANN
BY
Edwin Coates
ATTORNEY

Patented Feb. 15, 1949

2,461,967

UNITED STATES PATENT OFFICE 2,461,967

AERODYNAMIC RETARDER

Leo J. Devlin and Edward H. Heinemann, Los Angeles, Calif., assignors to Douglas Aircraft Company, Inc., Santa Monica, Calif.

Application December 26, 1945, Serial No. 637,235

9 Claims. (Cl. 244—113)

This invention relates to aerodynamic devices for decelerating the flight of aircraft. It is particularly concerned with aerodynamic retarders of the type comprising auxiliary surfaces movably mounted on the fuselage and normally lying remounted thereagainst but extendible therefrom into the airstream.

The extended airfoils of such devices desirably increase the parasitic drag of the aircraft, diminishing its speed and inhibiting its acceleration. They are hence usually actuated preparatory to initiating or terminating a dive. The present device, however, possesses considerable additional utility, as in connection with other manoeuvering functions and in predetermining or limiting the attitude of the craft in a dive and in the "pullout" therefrom.

Prior aerodynamic retarders, when sufficiently effective as decelerators to warrant adoption for this purpose, concomitantly incorporate serious aerodynamic, operational, or structural disadvantages. For example, some inescapably incorporate negative pitching moments which tend to throw the airplane into a vertical dive, wherein the other moments become indeterminate and variable, so that controlled recovery becomes impossible. Others produce excessive or cumulative positive pitching moments, rendering it impossible to maintain the craft in the desired dive, or properly aimed at the target.

Most prior such devices, because of their aft location and the alignment of their wakes with the horizontal empennage surfaces, induce considerable buffeting on these surfaces, seriously impairing the controllability of the aircraft. They are so mounted with respect to the adjacent side of the fuselage that, at least in their initial opening phases, the airstream impounded at their junction with the fuselage sets up severe buffeting directly on their active surfaces. The fuselage vibrations induced by this buffeting contribute greatly to pilot fatigue, and cause rudder shake.

Their drag surfaces are usually impositively actuated, being moved to open position in the rearward direction, solely by the action of the airstream itself. It is substantially impossible accurately to control such drag surfaces, or to set them at a pre-selected position. To retract them, they must be moved forwardly, against the airstream. Relatively powerful mechanism must therefore be employed, and when it fails to operate substantially perfectly, the surfaces remain in a more or less extended position. As a consequence, control of the aircraft may be lost.

Structural failures are not unlikely in these forwardly-angling decelerators. The active surfaces impound the airstream cumulatively between themselves and the fuselage and hence may eventually carry completely away from the craft. Being mounted above the longitudinal center line of the fuselage and near the empennage, the freed airfoils fly rearwardly and bring up forcefully against the empennage, seriously damaging same and sometimes rendering the control surfaces thereof completely inoperative.

The present invention obviates these and other disadvantages and difficulties, and provides an improved aerodynamic retarder. The retarder, although highly effective in restricting or terminating acceleration, in maintaining the airplane in proper attitude during the dive, and in facilitating manoeuvering, has no buffeting, destabilizing, de-trimming, or any other adverse aerodynamic effect on any portion of the craft, and incorporates no operational or structural disadvantages.

Essentially, the device comprises a plurality of surfaces of an improved drag-intensifying nature, rotatably mounted near their forward ends in wells on the lower half of the periphery of the fuselage, and occupying stations lying aft of, and longitudinally adjacent to, the trailing edge of the wing.

These drag surfaces may be of two general types: the panel type, consisting of relatively broad quadrangular, plate-like members, adapted to be mounted singly in each peripheral station; and the finger type, consisting of attenuated plate-like members generally of irregular, for example, hexagonal, plan form, several of these members being mounted in each peripheral station.

The drag surfaces are adapted for positive actuation in unison, being rotatable outwardly and forwardly in the upstream direction to locked active positions by positively acting protracting and retracting mechanism. Although, in their retracted positions, some of the surfaces lie well above the lowermost region of the empennage, means are provided that assure that these surfaces will lie well below the empennage in their protracted positions. The wake of each of these surfaces is thus positively directed outwardly and downwardly away from the fuselage and below the lowermost surface of the empennage; and this fact, in combination with the other factors of the invention, positively precludes the occurrence of buffeting on the empennage surfaces.

When extended, the active face of each surface angles rearwardly, or downstream, with respect to the air flow, and in all embodiments, aerodynamic gaps or slots are preferably provided between the inboard ends of the drag surfaces and the adjacent surfaces of the fuselage.

Side-mounted panel drag surfaces, if included in airplanes having a fuselage-shape conducive to same, may tend to impound or trap the air flow at the junction of the drag surfaces with the fuselage. In connection with other factors, this impounding may tend to cause buffeting on the active faces of the drag surfaces. Under such circumstances, the invention contemplates the embodiment of normally closed duct-means in the fuselage side, at the inboard end of these drag surfaces. This duct, when opened, by-passes the airstream inwardly of these ends and conducts the airstream and the fuselage boundary layer thereat rearwardly, precluding the occurrence of drag surface buffeting in this critical opening phase. Fuselage vibration and rudder shake are thereby obviated.

In those embodiments of the invention wherein a plurality of the finger type drag surfaces are employed in each station, each of such surfaces is constructed with a width considerably less than its length, and channels are provided between the longitudinally adjacent edges of the fingers, the forward, or entrance, ends of these spaces being laterally diverged. Not only is buffeting of the empennage precluded by this construction and arrangement of parts, but the occurrence of buffeting directly on the drag surfaces themselves is obviated.

All the drag surfaces lying substantially below the longitudinal median plane of the fuselage in the extended position, the surfaces produce no adverse destabilizing or de-trimming effects upon the craft. On the contrary, it has been found in service that the retarder produces a highly desirable positive pitching moment which can be restricted to a constant value of small magnitude. This pitching moment tends to urge the nose of the diving airplane upwardly towards horizontal trim and precludes the occurrence of indeterminate or uncontrollable moments. The dive can thus be invariably terminated at the proper "pullout" angle and in the desired direction.

Inasmuch as all the drag surfaces are positively actuated upstream against the air flow, they can hence be directly controlled and accurately set and locked in any desired operating angle relative to the airstream. Preferably, however, outward angular deflection thereof is limited to an angle considerably less than a right angle. In consequence, buffeting on the active surfaces thereof is further inhibited and the rearwardly angling drag surfaces are less apt to be carried away by excessive air loads than the previous such drag surfaces. If they do fail and carry away, they are unlikely to bring up against the empennage, their downwardly inclined attitudes tending to cause the freed surfaces to fly aft under the empennage. In the event of failure of the retracting mechanism, there is little likelihood of the rearwardly angling drag surfaces remaining "frozen" or jammed in an extended position, the force of the airstream itself being sufficient to close the airfoils downstream into their wells.

The other features and accomplishments of the invention will become apparent as this specification proceeds.

Several of the presently preferred embodiments of the invention are illustrated in the accompanying drawings and described hereinafter in connection therewith. It is to be understood, however, that the invention is limited in the embodiments which it can assume, only by the scope of the accompanying claims.

In these drawings:

Figure 1 is a side view of an airplane embodying one form of the invention, the retarder being in operating condition;

Figure 2 is a fragmentary horizontal section on line 2—2 of Figure 1 with the drag surface in retracted position;

Figure 3 is a fragmentary perspective of the airplane illustrated in Figure 1, showing the retarder and its operating mechanism in operating condition;

Figure 4 is a fragmentary horizontal section of a fuselage incorporating another form of the invention in operating condition.

Figure 5:
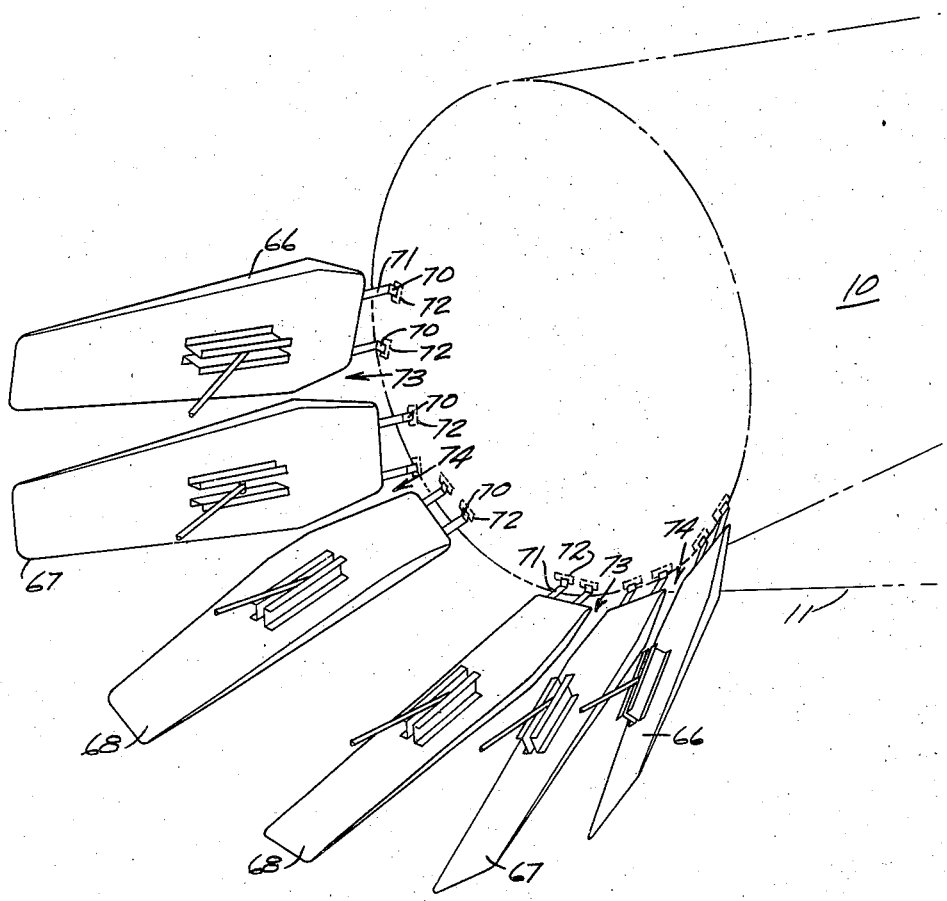
Figure 5 is a fragmentary perspective of a fuselage incorporating still another form of the invention.

In the accompanying drawings, the invention is illustrated as incorporated in a combat type of airplane. However, although highly advantageous and effective in such types, the invention is by no means limited in its scope to use in this particular environment. For example, the retarder also finds eminent utility in commercial types of airplanes, its employment therewith enabling diving approaches, eliminating the long approach glides or spirals at present necessary in landing such airplanes. The "block-to-block" schedule time of operation of airliners incorporating the invention is thereby profitably reduced.

The retarders included in the combat type airplanes shown in the drawings respectively incorporate both the panel type and the finger type. The particular panel type illustrated consists of a generally trapezoidal plate-like member having a maximum width closely approximating its maximum length. Its planar external, or active, surface tapers rearwardly and has rounded corners to inhibit the formation of vortices thereat. Preferably, only one of these panels is mounted in each of the predetermined stations on the sides and on the bottom of the fuselage. The specific finger type depicted consists of an attenuated member having a length considerably greater than its maximum width and having a planar outer, or active, surface, with rounded vortex-inhibiting corners. Several of these airfoils are adapted to be hingedly mounted near their forward edges in a fore-and-aft attitude on each side of the fuselage, and several on the bottom thereof. Adjacent finger type airfoils are so constructed and mounted as to enable them to co-act with the airstream and to aerodynamically cooperate with each other, in a novel manner hereinafter described.

The application of the term "airfoil" to the drag-surfaces is not intended to limit them to the conventional type, the term instead being employed to indicate the feasibility of any type of surface capable of producing the desired dynamic reaction with the airstream.

In the construction illustrated in Figures 1 to 3, inclusive, the aircraft incorporates a retarder comprising three of the panel type drag-intensifying surfaces and includes a fuselage 10 on which is mounted a wing 11, and an empennage which includes vertical surfaces 12 and horizontal surfaces 13, the retarder being generally designated by the reference numeral 14. The craft also includes a landing gear 15 which may be partially or wholly extended in cooperation with the aerodynamic retarder, for a purpose more fully explained hereinafter.

The drag-intensifying surfaces are movably mounted on the lower half of the periphery of the fuselage, below the standard fuselage reference line, in stations closely adjacent the trailing edge of the wing. One of the drag surfaces 16 is rotatably mounted on each side of the fuselage, the third drag surface 17 being mounted on the lowermost surface, or belly, of the fuselage. Each of the members 16 may have its entering edge raked forwardly with respect to its trailing edge, to enable it to clear a circular fuselage side in protracting and retracting same. In longitudinal section, each of the members 16 is preferably of a plano-convex, lift-surface contour, the convex inner surface being provided to prevent separation of the airstream from its inner face when it is open. The bottom drag member 17 may be somewhat broader than the side members. In longitudinal section, it is of a generally triangular, or trussed, contour, since the need to prevent separation is not so urgent here.

All three drag surfaces normally lie stowed in longitudinally extending wells constituted by indented portions of the skin of the fuselage, each of the side mounted drag surfaces 16 lying in a well 18 and the bottom drag surface 17 lying in a well 19. Each of the wells is of a depth sufficient to house its associated drag surface with its outer skin flush with the surrounding surface of the fuselage, although if desired, the skin may laterally overlap the exterior boundaries of the well. The wells preferably have a somewhat greater fore-and-aft extent than that of the drag surfaces, as best seen in Figure 1.

For use in environments where rudder shake is likely to arise from the airstream disturbance created in the initial opening phases of the airfoils, the surface 18a defining the bottom of each of the wells 18 may be constructed, as shown in Figure 2, with a somewhat greater concavity than the convexity of the adjacent inner surface of the drag members 16. This construction defines, between each of the side drag members 16 and the bottom of the well, when these members are juxtaposed, a longitudinally extending space or duct 20, the purpose of which is hereinafter described. The bottom well 19, however, has a depth and configuration such as to house the bottom drag surface therein in close contact therewith, with no appreciable gap between the adjacent surfaces.

Each of the drag surfaces is hinged to the forward end of the inner wall of its corresponding well, the side drag surfaces 16 being hinged thereto by means of suitable hinge arms 21 extending forwardly in parallelism from the forward end of the drag surface. Each hinge arm is provided with a knuckle 22, each knuckle being downwardly inclined, with respect to the rest of the arm, at an angle sufficient to confer a forward inclination upon the hinge axis. Complementary hinge knuckles 22a are provided in the wells. Thus, when the side drag surfaces 16 are revolved outwardly and forwardly about their hinge axes into their extended position, they droop well below the horizontal. That is, the longitudinal center line of each of these drag members revolves to a position lying below the fuselage reference line, whereby to direct the wake from the end edge and the side edges of the drag surface considerably below the lowermost point of the empennage.

The bottom drag surface 17 is provided with parallel hinge arms 23, terminating forwardly in hinge knuckles 24 engaging suitable knuckles 24a in the well. The axes of these hinge knuckles, contrary to the preceding ones, lie normal to the longitudinal center line of the fuselage and at right angles to the hinge arms. When the bottom surface is protracted, it therefore merely revolves forwardly in the vertical plane.

Mechanism for protracting and retracting all three drag surfaces concurrently is mounted in the fuselage and is constructed as best seen in Figure 3. As there illustrated, this mechanism comprises hydraulic motors or jacks 25 suitably pivotally mounted at their respective rear ends, as by means of I-bolts 26, on brackets 27 and 28, respectively united to the fuselage framework. These jacks include piston rods 29 pivotally connected at their forward extremities by means of I-bolts 30 to anchorage brackets 31 suitably connected to the framework of the drag member. Each I-bolt 30 is pivotally engaged over stud bolts 32 transversely mounted in the anchorage bracket. Conventional fluid pressure hoses 33 connect the rearward end of each jack to a control unit, such as a master valve 34. It is to be understood that the particular control unit shown is merely representative, any desired conventional control means being contemplated as within the scope of the invention. The closure member of this valve is adapted to be operated by a link 35 movable by a pilot's lever 36 located in the pilot's compartment and adapted to be actuated to control the ingress of pressure fluid through inlet 37 and the egress thereof through outlet 38, in order to actuate the hydraulic jacks.

All the drag surfaces are mounted in their wells with their entering edges spaced rearwardly from the hinge axis, which in turn is spaced rearwardly from the forward edge of the wall, the construction thus establishing a gap 39 between the entering edge of each drag surface and the inner surface of the well.

In fields of employment where the use of such a retarder tends, at least in the initial phases of its protraction, to induce rudder shake, it may become desirable to employ the duct 20 between the convex inner surfaces of the side drag member and the concave bottom surface of the well. The gap 39, and hence the entrance to the duct, is, in such case, adapted to be closed, in the retracted position of the drag surface, by means of a sliding plate or door 40. In such position, the door is moved to its closed position by means of a link 41 connected at one end to the inner surface of the drag member, and at the other end, to one arm of a bellcrank 42. The other arm of said bellcrank is connected by means of a link 43 to the inner surface of the door 40. When the doors are closed, the retarder creates a negligible amount of turbulence and skin-friction drag, since the gap is covered and the planar outer surfaces of the drag members are flush with the outer surface of the fuselage.

As the drag surfaces are extended or protracted outwardly, forwardly, and downwardly, however, these doors are moved forwardly by the operating linkage shown, and the ducts 20 are opened and enlarged rearwardly towards their open rear ends. The airstream and fuselage boundary layer ahead of the wells then flows past the inboard ends of each of the side mounted drag surfaces 16 and into the open-ended ducts 20. In these ducts, the convex inner surface of the drag member and the concave bottom surface of the well cooperate to define an undisturbed flow path for the airstream. Separation of the airstream from the drag surfaces in the initial opening phases of the retarder, with consequent turbulences and buffeting on the drag surfaces, is thus precluded. The airstream leaving the retarder and impinging upon the horizontal and vertical surfaces of the empennage hence arrives there substantially in an undisturbed condition. Rudder shake, fuselage buffeting and tail buffeting are thereby precluded.

Accumulation, or "impounding," of the airstream in the apex of the angle between the drag surface and the fuselage, with consequent increase of turbulence and pitching, is also thereby prevented. Although the airfoils, when open, occupy a positive pitch-producing position, lying well below the fuselage, the opening of the ducts and of the gap between the bottom flap and the adjacent surface of the fuselage prevents accumulative increase of this positive pitching moment and restricts this moment sufficiently to prevent the craft from climbing out of its "aiming" dive, or, tending to pitch too far upwardly.

Many types of airplanes have fuselages and empennages so designed that when the present retarder is incorporated therein, its initial opening phase sets up no buffeting at the inboard ends of the side mounted drag surfaces or elsewhere on these surfaces, and hence causes no rudder shake. In such airplanes, the duct 20 may be dispensed with, the volumetric space in the well forward of the entering edge of the drag surfaces being then closed off by a fillet or the like and the inner face of the retracted drag surfaces fitting tightly against the concave bottom of the well, in retracted position.

The drag surfaces 16 and 17, being arranged with their longitudinal axes extending in the direction of the airflow, are adapted to present an effectively large active surface to the airstream without necessitating their being opened outwardly at an angle sufficiently great to set up turbulence thereat. This feature contributes to the inhibition of buffeting thereon and assists in eliminating fuselage vibration and rudder shake. Usually, the maximum angle of outward deflection need not exceed 50°, yet in this position, the retarder is quite effective. For example, when so extended, its use restricts the acceleration of an airplane having a terminal velocity of 450 knots in a dive from 20,000 feet, to such an extent that its air speed is reduced to 270 knots at 3,000 feet, after having protracted the drag surfaces at about 4,000 feet.

If desired, the landing gear 15 may be fully or partially extended concurrently with the extension of the drag surfaces and then assists the retarder in decelerating the aircraft.

The embodiment illustrated in Figure 4 includes four drag-intensifying surfaces, one surface 16 of the panel type, being mounted on each side of the fuselage and two surface 44, of the finger type, being mounted on the bottom, or belly, of the fuselage. The side mounted surfaces 16 are preferably substantially identical with those described in connection with the embodiment of Figures 1 to 3. They are hingedly mounted at their forward ends in wells 45 on the side of the fuselage, aft of the wing and below the horizontal fore-and-aft central plane of the fuselage, by hinges 45a constructed and located to provide gaps 46 between the entering edge of the airfoil and the forward end, and the bottom, of the well. The axes of the hinges are forwardly inclined, as, and for the purposes, described in connection with the embodiment of Figures 1 to 3. As in the preceding embodiment, these gaps are adapted to be closed by doors 47 operated by the movement of the airfoils, through the agency of operating linkage 48 constructed and functioning in the manner described in connection with the preceding embodiment. However, in this embodiment also, the doors and duct may be dispensed with, if desired, the gap being permanently closed by a fillet, not shown. These air foils are adapted to be revolved outwardly, forwardly, and downwardly around the forwardly inclined axes of the hinges 45a.

The two bottom drag-intensifying members 44 are also rotatably mounted on the fuselage, being hingedly attached thereto at their forward ends in wells 45b which extend fore-and-aft. Each of the members 44 comprises an elongated finger-like surface having a smooth outer face contoured longitudinally and transversely to the contour of the adjacent surfaces of the fuselage, and having its inner face contoured to the inner face of its well. The corners of the exterior face thereof are rounded to inhibit the formation of vortices, and the surfaces may each have a lift-surface contour in longitudinal section to prevent separation of the airstream from their inner faces. The surfaces are arranged in fore-and-aft attitude with their larger ends forward, the entering and trailing edges of each surface being inclined outwardly and rearwardly. Their inner longitudinal edges, in the aerodynamically critical forward portions thereof, are diverged outwardly away from each other, as shown, for a predetermined rearward distance. This distance may vary with other design factors but preferably is on the order of ⅕ of the length of the finger. At the rearward end of the orifice formed by this divergence, there is a point of inflection, whereafter the inner edges diverge laterally and rearwardly to the end of each finger.

A pair of hinge-arms 49 is attached to each surface at its forward edge, these arms extending forwardly in parallelism and terminating in a pair of hinge knuckles 50. The axes of these hinge knuckles are inclined outwardly and rearwardly with respect to the longitudinal axis of the drag surfaces. Mounted in each well, near the forward end thereof, is a complementary pair of hinge knuckles 50a, inclined outwardly and rearwardly with respect to the longitudinal center line of the fuselage through an angle equal to the inclination of the knuckles 50. Suitable hinge pins, or the like, are provided to complete the hinge. The outwardly and rearwardly inclined hinge axis of each of the drag surfaces 44 is spaced forwardly from the entering edge of the well, providing a gap 46 between the front end of each drag surface and the adjacent surface of the well. The doors 47, provided for closing the gaps 46 when the drag surfaces are in retracted position in their wells and opening these gaps when said surfaces are protracted, may be operated by the linkage 48 in the same manner as the previously described such doors.

The surfaces 44 are adapted to be revolved downwardly, forwardly, and laterally outwardly. That is, the hinge axis of each of the finger type drag surfaces being inclined outwardly and rearwardly, as these surfaces are protracted downwardly and forwardly, their forward ends are revolved convergingly towards each other, while their rearward ends are revolved divergingly relative to each other. When in their extended position, therefore, there is thus established a rearwardly and downwardly directed central passageway between the adjacent inner longitudinal edges of the airfoils. This passageway comprises an entrance orifice 51 leading into a throat-like constriction 52, and enlarges rearwardly as a channel 53.

The lateral dimensions of the drag surfaces, the lateral distance between the adjacent surfaces 44, and the extent of divergence of the forward ends of the adjacent longitudinal sides of these surfaces, are predeterminedly such as to preclude buffeting occurring on the active outer faces thereof. The inner faces are contoured in such manner as to prevent separation of the airstream therefrom.

The general airstream in the lower portion of the fuselage in this region is thus divided into a plurality of streams, a central, relatively small stream flanked by two larger lateral streams. None of these streams is as large or turbulent as the wake and eddy currents produced by each of the panel type drag surfaces. Indeed, the size, turbulence, and vortical content of the wake and eddy currents passing aft from these drag-intensifying surfaces is reduced to such an extent as to substantially obviate buffeting on the empennage members, as well as precluding same on the drag surfaces.

Protracting and retracting mechanism 65, constructed and operating in substantially the same manner as that previously described, is provided for simultaneously protracting or retracting all four drag surfaces. Pilot-operable control means, not shown, but, if desired, similar to the means previously described, are provided for actuating all the hydraulic jacks in unison to effectuate this simultaneous protraction and retraction of the four flaps.

The retarder illustrated in Figure 5 is constructed substantially on the principle included in the bottom members of the immediately preceding embodiment. The drag members shown in Figure 5 consist of a plurality of plate-like surfaces of relatively small width arranged laterally relatively closely together with forwardly diverging gaps between adjacent longitudinal edges thereof in the critical forward region of the retarder. These gaps terminate rearwardly in a constricted portion, or throat, whereafter the airstream channel enlarges rearwardly in laterally diverged fashion to the rear ends of the drag surfaces. This construction and arrangement of the drag surfaces provides an effective decelerator, while performing the dual function of preventing the occurrence of buffeting directly upon the active face of the drag members and of precluding buffeting upon the empennage surfaces.

The component drag surfaces of this embodiment of the invention are rotatably mounted on the lower half of the periphery of the fuselage, just aft of the wing, in two groups of three each, each group including an upper airfoil 66, a center airfoil 67, and a lower airfoil 68. The drag surfaces in each group are laterally separated and the two groups are peripherally separated from each other; that is, each group is laterally spaced outwardly from the longitudinal center line of the lowermost surface of the fuselage.

Each of the drag-intensifying surfaces is hinged at its forward end in an individual well 69 therefor, by means of hinge knuckles 70 on parallel hinge-arms 71, engaged, by suitable hinge pins, or the like, with corresponding hinge knuckles 72 attached to the fuselage.

The hinge axes of the two upper surfaces 66 are inclined somewhat forwardly with reference to the vertical axis of the fuselage, so that when they are extended outwardly, they will droop, or decline somewhat below the transverse horizontal plane passing laterally through their uppermost point of support, and hence direct the airstream downwardly below the lowermost surface of the empennage. The hinge axes of the two central surfaces 67 lie at right angles to the side of the fuselage; that is, they lie in the same plane as that of the vertical axis of the fuselage in this region. When these surfaces are extended, they neither incline upwardly nor decline downwardly, merely moving outwardly and forwardly parallel to themselves. Lying below the lowermost point of the empennage, however, their wakes cannot impinge thereupon. The hinge axis of the bottom or belly surfaces 68 incline rearwardly, or in the opposite direction to the direction of inclination of the hinge axes of the upper surfaces 66. Thus, when they are protracted, their rear ends revolve upwardly, or diverge laterally outwardly from the longitudinal center line of the fuselage. These surfaces also lie below the lowermost horizontal surface of the empennage and hence direct no appreciable wake thereto.

When, therefore, all six airfoils are revolved in unison outwardly and forwardly from their retracted positions in the fuselage wells, a plurality of drag-intensifying areas is exposed to the airstream. Although the area of each surface is intentionally small, the totality of areas is relatively large and effective. A relatively narrow lateral space is provided between the longitudinally adjacent edges of the adjacent drag surfaces and this space is enlarged forwardly in the critical entrance region of the retarder. The occurrence of buffeting directly upon the active faces of these members is thus precluded, whereby rudder shake or pilot fatiguing fuselage vibrations are obviated.

By protraction, the airfoils in each group are, furthermore, so displaced relatively to each other, in the peripheral direction of the fuselage, as to define fore-and-aft airstream channels 73 and 74 in each of the groups. Their protraction also defines a fore-and-aft channel 75 between the two groups, as shown in Figure 5. This channel is shown as somewhat wider than the other channels, in order to permit the passage of an arresting gear member, but it is to be understood that it is only required by the invention that this channel be at least equal in width to the others, in order to preclude buffeting occurring in the airfoils themselves. In establishing these channels, the forward ends of the upper and lower airfoils 66 and 68 in each group are, as these members are protracted, revolvingly converged toward the forward end of the center airfoil 67 and their rearward ends are revolvingly diverged from the rearward end of this airfoil. Their wakes are thus directed outwardly and below the empennage. The channels 73 and 74 defined by the longitudinally adjacent edges of the airfoils are downwardly and rearwardly directed with respect to the fuselage. Each of these channels comprises, as in the case of the belly surfaces of the immediately preceding embodiment, a relatively enlarged entrance orifice, a constricted throat, and a rearwardly enlarging discharge portion lying aft of same.

The airstream and fuselage boundary layer passing aft of the retarder are hence subdivided, as they impinge upon the forward ends of these airfoils, into a plurality of similar streams, reducing the size and turbulence of any individual wakes or eddy currents passing aft onto the surfaces of the empennage and inhibits buffeting thereon. The wakes from each group of airfoils hence arrive at the empennage in a substantially non-turbulent, undisturbed condition. Buffeting of the fixed surfaces of the empennage is hence inhibited. As a consequence, the controllability and stability of the aircraft are no wise impaired by the employment of the present retarder.

In all embodiments of the invention, the drag surfaces can be quickly operated, passing rapidly from a high-drag position to a no-drag position. Consequently, substantially no lag occurs, either in decelerating the craft or in allowing it to return to its normal velocity.

If buffeting should occur on the active faces of the drag surfaces, due, for example, to prolonging the dive excessively before extending the airfoils, it will be opposed by the substantially rigid actuating mechanism and transmitted to the substantially rigid fuselage, so that vibration or flutter of the airfoils will be restricted to the minimum.

We claim:

1. An airplane decelerator, comprising: at least one parasitic drag-intensifying airfoil rotatably mounted on each side of the fuselage; and means for protracting and retracting said airfoils in unison, the entering edge of each of said airfoils being located aft of the axis of rotation thereof a distance such as to define an aerodynamic gap between said edge and the forwardly adjacent and laterally adjacent surfaces of the fuselage; and means operable by the protraction of said airfoils for closing said gap.

2. An airplane decelerator, comprising: a plurality of parasitic drag-intensifying airfoils rotatably mounted near their forward ends on the fuselage in peripherally spaced stations on the sides and on the bottom of the lower half of the periphery thereof, each side station including a single airfoil and the bottom station including two airfoils, each of the latter airfoils having its axes of rotation inclined rearwardly and outwardly to the same degree with respect to the longitudinal center line of the fuselage.

3. An airplane decelerator, comprising: a plurality of drag-intensifying airfoils rotatably mounted near their forward ends on the fuselage in peripherally spaced stations on the sides and on the bottom of the lower half of the periphery thereof, each side station including a single airfoil having its axis of rotation inclined forwardly with respect to the vertical axis of the fuselage and the bottom station including two airfoils each having its axis of rotation inclined rearwardly and outwardly to the same degree wth respect to the longitudinal center line of the fuselage.

4. An airplane decelerator, comprising: a plurality of parasitic drag-intensifying airfoils rotatably mounted on the fuselage in peripherally spaced stations on the sides and on the bottom of the lower half of the periphery thereof, each side station including a single airfoil and the bottom station including two airfoils, each of the airfoils mounted in the side stations having a width substantially approximating its length and each of the airfoils mounted in the bottom station having a length considerably exceeding its width.

5. In an aircraft: a fuselage having a longitudinally extending concavity in the side thereof, and a longitudinally convex airfoil rotatably mounted in the forward end of said concavity, the inward extent of said convexity being less than the inward extent of said concavity at all longitudinal points of said airfoil and the entering edge of said airfoil being rearwardly located from its axis of rotation, whereby to define a forwardly opening duct extending longitudinally of the side of the fuselage; and means operable by the rotation of said airfoil downstream for closing the forward and rearward ends of said duct.

6. An airplane decelerator, comprising: drag-intensifying airfoils hingedly mounted for outward and forward rotation on the lower half of the periphery of the fuselage in two groups of three airfoils each, the airfoils in each group being arranged in peripheral juxtaposition and the two groups being peripherally spaced apart; each group including an upper airfoil, a central airfoil, and a lower airfoil; the hinge axis of the upper airfoil being forwardly and downwardly inclined with reference to the fuselage vertical axis, the hinge axis of the central airfoil lying co-planar with the fuselage vertical axis in its region, and the hinge axis of the lower flap being upwardly and rearwardly inclined with reference to the fuselage vertical axis at that point; and means for rotating said airfoils in unison.

7. An airplane aerodynamic retarder which is substantially buffetless, including: drag-intensifying members disposed on the fuselage in peripherally spaced stations rearwardly adjacent the center of gravity, said members comprising airfoils rearwardly elongate in the general direction of the airstream and having planar outer faces, rearwardly-cambered inner faces, streamline-rounded entering edges, and rounded trailing-corners; means hingedly mounting said surfaces in said stations by the forward edges thereof, the hinge-axes being forwardly spaced from the entering edges of said surfaces; and means for simultaneously rotating said surfaces forwardly to a limit position forming, with the impinging airstream, an angle greater than a right angle, to thereby establish gaps between the hinge axes and the corresponding entering edges of the surfaces, while disposing said edges, said cambered face and said rounded corners angularly to the airstream passing the fuselage; whereby to prevent the formation on said airfoils and on the fuselage in the neighborhood of said airfoils, of buffet-producing Von Kármán vortex streets.

8. An airplane aerodynamic retarder substantially incapable of inducing empennage buffeting, including: drag-intensifying surfaces disposed around the lower half only of the fuselage in peripherally spaced, inwardly concave stations, rearwardly adjacent the center of gravity, said members comprising airfoils cambered inwardly on their inner faces to a lesser extent than the inward extent of said concavities and hingedly mounted to the fuselage on axes lying ahead of the entering edges of said surfaces, thereby defining rearwardly extending airstream ducts lying between same and the fuselage whereby to direct the airstream impinging thereat rearwardly in laminar flow; said hinge axes being forwardly inclined sufficiently to position the rearward ends of the opened airfoils and their wakes, below the lowermost point of said empennage, thereby preventing the inception on said airfoils and transmission therefrom to the empennage of Von Karmán vortex streets.

9. An airplane aerodynamic retarder comprising rearwardly elongate drag-intensifying airfoils having a length greatly exceeding their width, hingedly mounted for outward and forward rotation on the lower half of the fuselage periphery, said airfoils being arranged in close peripheral juxtaposition, the adjacent longitudinal edges thereof, at their forward portions, diverging widely outwardly to form, in the opened position of the airfoils, an entering-orifice tapering rearwardly, said edges thereafter converging closely to form a throat, and thereafter diverging widely rearwardly to form a rearwardly enlarged exit orifice, whereby to direct the airstream, impinging upon the forward portions of said airfoils and exiting from said exit orifice, into contact with said empennage in substantially non-turbulent, non-buffeting flow.

LEO J. DEVLIN.
EDWARD H. HEINEMANN.

REFERENCES CITED

The following references are of record in the file of this patent:

UNITED STATES PATENTS

| Number | Name | Date |
|---|---|---|
| 1,157,636 | Ogrissek | Oct. 19, 1915 |
| 1,359,590 | Gillespie | Nov. 23, 1920 |
| 1,567,229 | Bohler | Dec. 29, 1925 |
| 1,710,938 | McLaughlan | Apr. 30, 1929 |
| 1,875,593 | Hall | Sept. 6, 1932 |
| 1,875,465 | Klingaman | Sept. 6, 1932 |
| 2,015,444 | Tupta | Sept. 24, 1935 |
| 2,189,553 | Schut | Feb. 6, 1940 |

FOREIGN PATENTS

| Number | Country | Date |
|---|---|---|
| 261,721 | Italy | Dec. 13, 1928 |
| 523,990 | Great Britain | July 26, 1940 |